(12) United States Patent
Schafer

(10) Patent No.: US 8,313,411 B2
(45) Date of Patent: Nov. 20, 2012

(54) BACKLASH-FREE PLANETARY GEAR UNIT WITH SPLIT PLANET GEARS, WHICH ARE PRELOADED BY SPRING BARS ARRANGED PARALLEL TO THE PLANETARY AXIS OF ROTATION

(75) Inventor: Rolf Schafer, Eichstetten (DE)

(73) Assignee: Maxon Motor AG, Sachseln (CH)

( * ) Notice: Subject to any disclaimer, the term of this patent is extended or adjusted under 35 U.S.C. 154(b) by 402 days.

(21) Appl. No.: 12/670,341

(22) PCT Filed: Feb. 9, 2009

(86) PCT No.: PCT/EP2009/000890
§ 371 (c)(1),
(2), (4) Date: Jan. 22, 2010

(87) PCT Pub. No.: WO2009/106222
PCT Pub. Date: Sep. 3, 2009

(65) Prior Publication Data
US 2010/0240490 A1 Sep. 23, 2010

(30) Foreign Application Priority Data
Feb. 26, 2008 (DE) .......................... 10 2008 011 147

(51) Int. Cl.
*F16H 57/08* (2006.01)
*F16H 55/18* (2006.01)
(52) U.S. Cl. .......................... 475/331; 74/409
(58) Field of Classification Search .................. 475/331; 74/409, 440
See application file for complete search history.

(56) References Cited

U.S. PATENT DOCUMENTS

| 2,845,809 A | 8/1958 | Hetzel | |
|---|---|---|---|
| 3,127,784 A * | 4/1964 | O'Neill | 74/440 |
| 3,138,035 A | 6/1964 | Sivaslian | |

(Continued)

FOREIGN PATENT DOCUMENTS
DE     7400276 U    4/1974
(Continued)

OTHER PUBLICATIONS

International Search Report (PCT/ISA/210) dated Apr. 16, 2009 corresponding to PCT/EP2009/000890.

(Continued)

*Primary Examiner* — David D Le
*Assistant Examiner* — Colby M Hansen
(74) *Attorney, Agent, or Firm* — Buchanan Ingersoll & Rooney PC

(57) ABSTRACT

The invention relates to a backlash-free planetary gear unit comprising a sun gear, an internal gear and at least one planet gear which is in mesh with said sun gear and said internal gear and which is arranged on a planet carrier such that it is rotatable about a planetary axis of rotation, wherein the toothed planet gear has a plane of division which is oriented perpendicular to the planetary axis of rotation and by means of which the planet gear is divided into a first planet subgear and a second planet subgear, wherein the first planet subgear is preloaded relative to the second planet subgear by a spring bar arranged in these two planet subgears substantially parallel to the planetary axis of rotation, and wherein a plurality of spring bars is arranged around the planetary axis of rotation.

11 Claims, 4 Drawing Sheets

U.S. PATENT DOCUMENTS

| | | | |
|---|---|---|---|
| 5,085,093 A * | 2/1992 | Heidrich | 74/411 |
| 5,492,029 A | 2/1996 | Obrist | |
| 6,148,684 A | 11/2000 | Gardiner | |
| 2003/0073537 A1 | 4/2003 | Lloyd | |
| 2004/0154422 A1 | 8/2004 | Menjak et al. | |

FOREIGN PATENT DOCUMENTS

| | | |
|---|---|---|
| DE | 197 57 433 A1 | 6/1999 |
| EP | 1 034 923 A1 | 9/2000 |
| FR | 2 805 327 A1 | 8/2001 |
| JP | 62-151464 | 9/1987 |
| JP | 2-113154 A | 4/1990 |
| JP | H2-113154 | 4/1990 |
| JP | 02-129434 | 5/1990 |
| WO | WO 02/09998 A1 | 2/2002 |

OTHER PUBLICATIONS

Notice of Reasons for Rejection issued on Apr. 24, 2012 by the Japanese Patent Office in corresponding Japanese Application No. 2010-514017.

* cited by examiner

US 8,313,411 B2

BACKLASH-FREE PLANETARY GEAR UNIT WITH SPLIT PLANET GEARS, WHICH ARE PRELOADED BY SPRING BARS ARRANGED PARALLEL TO THE PLANETARY AXIS OF ROTATION

RELATED APPLICATION(S)

This application is the National Stage of PCT/EP2009/000890 filed on Feb. 9, 2009, which claims priority from German Application 10 2008011147.3 filed on Feb. 26, 2008, the entire contents of these applications being incorporated herein by reference.

FIELD

The invention relates to a backlash-free planetary gear unit comprising a sun gear, an internal gear and at least one planet gear which is in mesh with said sun gear and said internal gear and which is arranged on a planet carrier such that it is rotatable about a planetary axis of rotation, wherein the toothed planet gear has a plane of division which is oriented perpendicular to the planetary axis of rotation and by means of which the planet gear is divided into a first planet subgear and a second planet subgear, wherein the first planet subgear is preloaded relative to the second planet subgear by a spring bar arranged in these two planet subgears substantially parallel to the planetary axis of rotation.

BACKGROUND INFORMATION

Various backlash-free planetary gear units are known from the prior art, e.g. from US 2003/0073537 A1 and from DE 197 57 433 A1.

US 2003/0073537 A1 discloses four different embodiments of a backlash-free gear unit. A planetary gear unit has here an internal gear which is split into two parts with different diameters. As is normally the case with planetary gear units, toothed planet gears mesh with a sun gear on the one hand and an internal gear on the other. In the case of this US application, two parts of the respective planet gears mesh with the two parts of the internal gear. The planet gears are divided into two planet subgears, one of said planet subgears having a diameter which is smaller than that of the other.

The planet subgears having the smaller diameter mesh with the internal gear which is smaller in diameter than the other internal subgear. The larger internal subgear is in mesh with the planet subgears having a larger diameter than the other planet subgears. One of said internal subgears is positioned stationary, whereas the other internal subgear is freely rotatable. The respective two planet subgears defining an entire planet gear are freely rotatable relative to one another in opposite directions of rotation about one and the same planetary axis of rotation. The teeth of one of said planet subgears can therefore be rotatably displaced relative to the teeth of the other planet subgear to a minor extent, so that the respective teeth of the planet subgears, which are in mesh with the respective internal gears, will abut on the respective tooth flanks of the internal subgears without backlash.

In the four embodiments disclosed, different ways of accomplishing the preload, i.e. for accomplishing the rotary displacement between one planet subgear and the associated other planet subgear, are disclosed.

The first embodiment described is so conceived that a pin protrudes through an opening of the first planet subgear up to and into the second planet subgear. The pin is fixedly anchored in the second planet subgear. The upper end of the pin is in contact with a clip, said clip having a partially annular cross-section and being connected to a second pin which is fixedly anchored in the planet subgear. By means of this pin/clip combination a preload can be achieved between the planet subgears.

In a second embodiment, the preload can be accomplished by means of a conventional helical compression spring, which is arranged in a slot of the first planet subgear and which is in contact with the first planet subgear and a pin, said pin being fixedly anchored in the second planet subgear.

In a third embodiment, a concentrically arranged, torsionally flexible shaft is disclosed. When the first planet subgear is fixed to the shaft in such a way that the teeth of the two planet subgears are not in alignment, a torsional force will act on the two planet subgears, when the teeth of these two planet subgears are arranged in alignment with one another.

Alternatively to the above embodiments, a fourth embodiment of US 2003/0073537 A1 is so conceived that a radially arranged flexure element for applying the preload between the two planet subgears is in contact with a shaft and a pin which is arranged eccentrically parallel to the axis of rotation of the two planet subgears.

The prior art also comprises various documents which disclose that a preload is applied to gears used in normal gear units. EP 1 034 923 A1, for example, discloses spring elements for avoiding backlash in gear units. Also U.S. Pat. No. 2,845,809 deals with the fact that two gears are preloaded relative to one another so as to prevent backlash. Also JP 02113154, U.S. Pat. No. 3,138,035 as well as U.S. Pat. No. 5,492,029 disclose solutions for avoiding backlash between gears. Related prior art is also known from DE 7400276 U, US 2004/0154422 A1 and FR 2805327 A1.

The solutions known for conventional gears are disadvantageous insofar as such gear units require a lot of space. Especially for the drive units of small electric appliances, it is important that the space required is only small.

In the case of planetary gear units it is very complicated to eliminate backlash. The four solution variants according to US 2003/0073537 A1, for example, have a lot of drawbacks. It is e.g. necessary that one of the internal subgears is arranged in a stationary manner and that the planet subgears have different diameters. Also the preloading of the planet subgears relative to one another is accomplished in a rather complicated manner: the variant of using a soft torsional spring having a partially annular cross-section for accomplishing the preload necessitates that the respective pins project in the direction of the planetary axis of rotation so as to prevent the clip from falling off and the resultant failure of the planetary gear unit. Additional space will thus be needed.

When a helical compression spring which is arranged orthogonally to the planetary axis of rotation is used, the spring will have to be additionally protected against falling out of the opening of the first planet subgear, and also this will increase the amount of space required.

Also the third variant, which makes use of a torsionally flexible shaft for preloading, requires complicated fixing solutions and makes mounting particularly laborious in view of the small dimensions in planetary gear units, especially in view of the small degrees of freedom. Also the variant concerning the use of a radially arranged preloading element requires a substantial amount of space.

SUMMARY

It is the object of the present invention to extremely reduce the amount of space required, and to provide a maintenance-free operation of the planetary gear unit for a long period of use. In addition, the invention intends to provide a backlash-free condition of the planetary gear unit at a reasonable price.

This object is achieved by the present invention in that one or a plurality of spring bar(s), which is/are subject to a bending load and which is/are supported in the two planet subgears, is/are arranged around the planetary axis of rotation, at least one spring bar being arranged in a first recess of the first planet subgear and in a second recess of the second planet subgear, said first and second recesses extending up to and into the area of the plane of division, and the first recess and the second recess being implemented as holes widening towards the plane of division.

An eccentric mode of arrangement of the spring bars allows a transmission of higher forces to the planet subgears without causing an increase in the amount of space required. It is therefore possible that the planetary gear unit operates maintenance free for a long period of use, even in the case of load alternations and changes of direction. The service life of such planetary gear units is increased. The applicability for narrow and miniature applications is improved as well. This kind of planetary gear units can be used advantageously in particular for electronic miniature devices. When the spring bars are subject to a bending load, a defined, easily predictable and adjustable deformation behaviour, which can also be represented by a known bending line, can be utilized, whereby the preload to be accomplished between the two planet subgears can be adjusted in a particularly accurate manner. Such spring bars can also be produced at a reasonable price or they can be acquired by purchase, whereby the costs for the planetary gear units according to the present invention will be reduced. Furthermore, such planetary gear units are self-adjusting when they are in operation, especially in the case of wear. A radial backlash at the sun gear and the internal gear will be compensated for. Also the assembly is easy to execute.

When the spring bars are arranged in first recesses of the first planet subgear and in second recesses of the second planet subgear, said first and second recesses extending up to and into the area of the plane of division, it will be particularly simple to anchor the spring bars of such an embodiment in the two planet subgears and to accomplish the preload.

In order to avoid a deformation of the spring bars under a shearing strain, it will be of advantage when, according to another embodiment, the first recess and the second recess are implemented as holes widening towards the plane of division, and when they are preferably enlarged in a kidney-shaped or fan-shaped manner in the area of the plane of division in the direction in which the planet subgears are rotatably displaced relative to one another. Especially holes that are implemented as blind holes will prevent the spring bars from extending beyond the planet subgears on the respective side facing away from plane of division and from causing damage to elements of the planetary gear unit, e.g. to the planet carrier.

In the subclaims advantageous embodiments are claimed, which will be described in more detail in the following.

The costs of the planetary gear unit and the probability of failure will be reduced still further, when, according to an advantageous embodiment, the spring bars are made of metallic material, preferably of spring steel. Such spring steel bars are robust and inexpensive. In addition, they are easy to store.

The use of oval shafts has the advantage that radial backlash can be compensated for in a particularly efficient manner.

A support of cast and/or sintered cores can be achieved and the spring bars can simultaneously be prevented from falling out of the planet subgears, when at least one of the first or second recesses is implemented as a through hole and has, on the side remote from the plane of division, a diameter which is smaller than the diameter of the spring bars.

When the first planet subgear is preloaded relative to the second planet subgear by means of three spring bars which are arranged such that they are equidistant to one another, eccentric forces acting between the planet subgears can effectively be prevented. Furthermore, the thickness of the spring bars can be reduced, and the necessary preload can nevertheless be accomplished. This will reduce the weight of the planetary gear unit and the necessity of carrying out maintenance work, and the reliability of the planetary gear unit will be improved in the long run.

In order to reliably guarantee that the spring bars are anchored in the two planet subgears, and in order to guarantee an adequate transmission of force, it will be of advantage when, in a further embodiment, the spring bars extend through $3/4$ to $7/8$, preferably $13/16$, of the thickness of the first and/or second planet subgear(s), said thickness measured in the direction of the planetary axis of rotation.

In order to make the assembly as easy as possible, it will be of advantage when, in a further embodiment, the first recesses are displaced relative to the second recesses, when the teeth of the first planet subgear are in alignment with the teeth of the second planet subgear.

When a first recess is tangentially displaced relative to a second recess, preferably mirror-symmetrically with respect to a symmetry axis through the respective tooth and the planetary axis of rotation, it will only be necessary to manufacture an individual planet subgear, to turn it over once, so that the recesses are disposed in opposed relationship with one another, and to insert the spring bars, whereby a displacement of the individual teeth of one planet subgear to the other planet subgear will be accomplished automatically. This will effectively prevent incorrect mounting.

In addition, the assembly will be simplified still further, when, in a further embodiment, the spring bars are held in a tight sliding seat in a section of the first and/or second recess(es) which is remote from the plane of division.

BRIEF DESCRIPTION OF THE DRAWINGS

In the following, the invention will also be explained in more detail with the aid of a drawing, in which.

DETAILED DESCRIPTION

Figure 1:
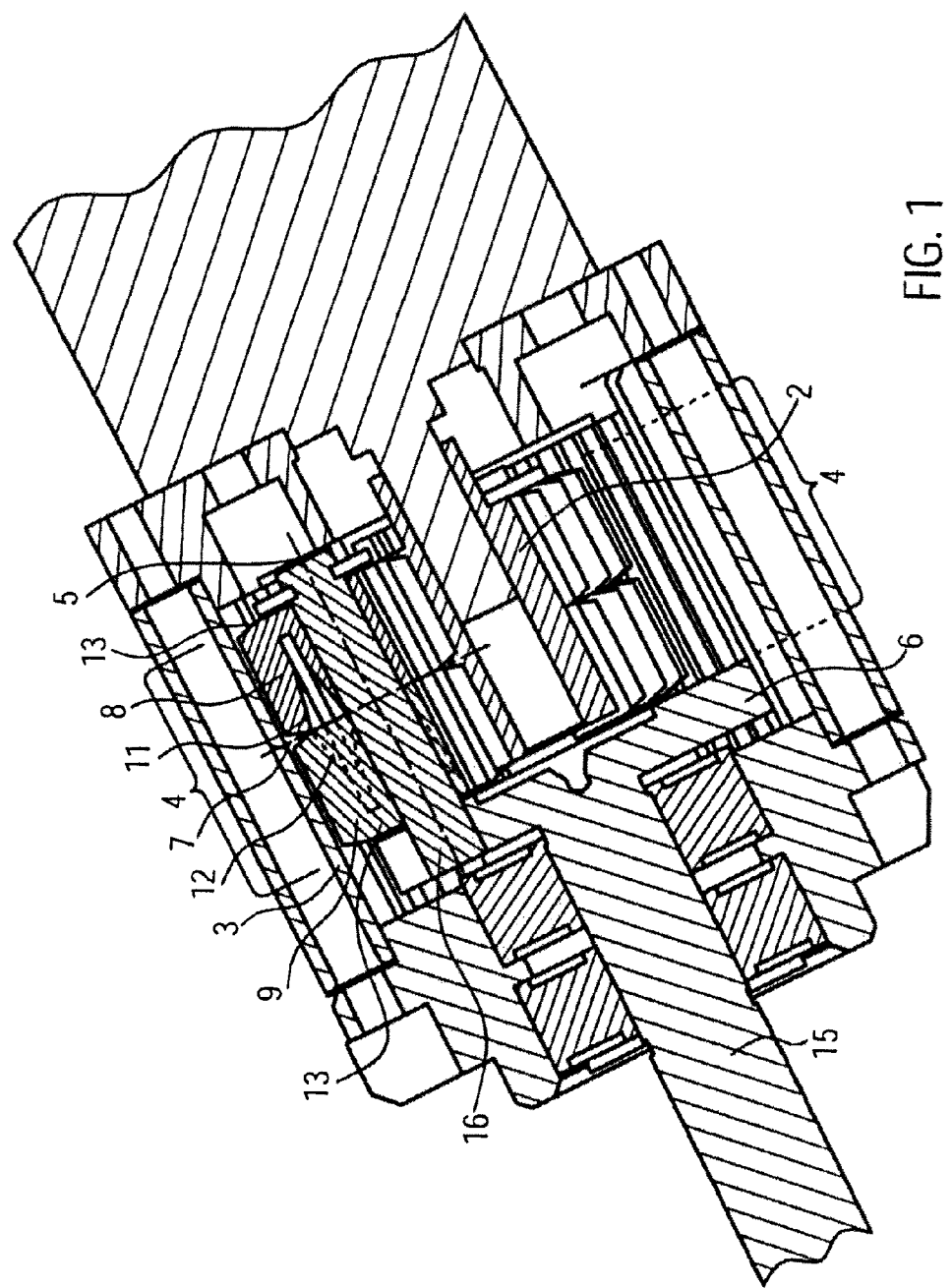
FIG. 1 shows a cross-section through a planetary gear unit according to the present invention.

FIG. 1 shows a planetary gear unit 1 according to the present invention. The planetary gear unit 1 comprises a sun gear 2, an internal gear 3 and three planet gears 4. In view of the fact that the planet gears 4 are displaced by 120° about the axis of rotation of the sun gear 2, only two of the three planet gears 4 are shown in the representation according to FIG. 1. Alternatively to the use of three planet gears 4, also an even number of planet gears 4, in particular four planet gears 4, may be used. This has the advantage that eccentric forces will be prevented.

The individual planet gears 4 each have a planetary axis of rotation 5. A planetary axis of rotation 5 is shown in FIG. 1.

The planet gears 4 are rotatably connected to a planet carrier 6. The planet gears 4 are each divided into a first planet subgear 8 and a second planet subgear 9 along a plane of division 7. The first planet subgear 8 is arranged such that it is rotatable relative to the second planet subgear 9 about the same planetary axis of rotation 5, the two planet subgears 8 and 9 being arranged on one shaft. The shaft is secured in position in the planet carrier 6 and is provided with a safety device, especially a snap ring, on an end located opposite the planet carrier 6. The snap ring is arranged such that it is not in contact with the first planet subgear 8 so that it will be prevented from rotating together therewith.

In the first planet subgear 8 and in the second planet subgear 9 three spring bars 10 are arranged in such a way that the spring bars 10 are connected to both planet subgears 8 and 9. The spring bars 10 are inserted in a first recess 11 provided in the first planet subgear 8 and in a second recess 12 provided in the second planet subgear 9. The first recess 11 and the second recess 12 are implemented as blind holes. The blind holes widen conically from a level that is spaced apart from their bottom up to the surface located on the side of the plane of division 7. It follows that the blind holes are conical in shape along a certain section thereof. In this conical area, the spring bars 10 are in contact neither with the wall of the first recess 11 nor with that of the second recess 12. It is only in the bottom area of the first recess 11 and of the second recess 12 that the spring bars 10 are in contact with the walls of the first recess 11 or of the second recess 12, i.e. with the first planet subgear 8 or the second planet subgear 9. In this area, the blind holes have a diameter of such a nature that they provide a tight sliding seat for the spring bars 10.

The spring bars 10 are implemented as round spring steel bars. The spring steel bars are subject to a bending load when the planetary gear unit 1 is in use. The conical widening of the first and second recesses 11 and 12 is necessary for avoiding a deformation of the spring bars 10 under a shearing strain when a rotary displacement of the first planet subgear relative to the second planet subgear takes place.

The spring bars 10 are arranged such that they are equidistant to the planetary axis of rotation 5. The spring bars 10 are also arranged such that they are equidistant to one another. Furthermore, measured from the planetary axis of rotation 5, an angle of 120° is defined between the respective spring bars 10. The two planet subgears 8 and 9 are each provided with teeth 13. The teeth 13 are in mesh with teeth of the internal gear 3 and teeth of the internal gear 2.

The sun gear 2 is connected to a drive shaft 15 of an electric motor. The planet carrier 6 is connected to a driven shaft or, as in the present case, it is implemented such that the driven shaft constitutes an integral component thereof. The internal gear 3 is fixedly connected to the housing of the planetary gear unit 1.

The two planet subgears 8 and 9 are implemented such that their teeth 13 are not in alignment with one another, when the first recess 11 and the second recess 12 are in alignment with one another. When the teeth 13 of the first planet subgear 8 and of the second planet subgear 9 are in alignment with one another, the first recess 11 and the second recess 12 will not be in alignment. The spring bars 10 are then, due to their bent state, preloaded and force the first planet subgear 8 and the second planet subgear 9 in a direction about the planetary axis of rotation 5 in such a way that the teeth 13 of the two planet subgears 8 and 9 will come out of alignment. This has the effect that one flank of a tooth 13 of the first planet subgear 8 will be in contact with an oppositely located flank of the internal gear 3 and/or of the sun gear 2.

The flank of the second planet subgear 9 which, when seen relative to this first-mentioned flank, is located on the other side of a symmetry axis 14 through the tip of the tooth and the planetary axis of rotation 5, is also in contact with a flank of a tooth of the internal gear 3 and/or of the sun gear 2.

This has the effect that the planet gear 4 meshes with the sun gear 2 and/or the internal gear 3 in a backlash-free manner. In order to achieve this, appropriate degrees of freedom will have to be chosen for the dimensions of the teeth of the sun gear 2, of the internal gear 3, of the first planet subgear 8 and of the second planet subgear 9.

Figure 3:
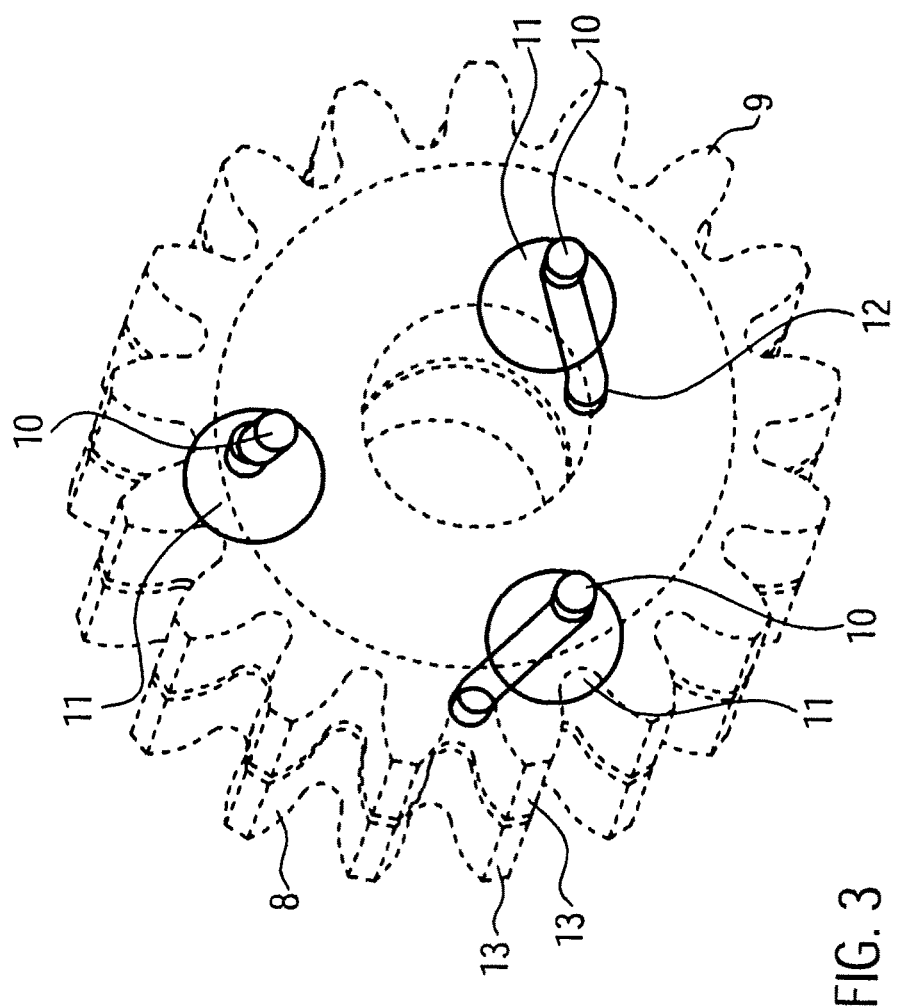
FIG. 3 shows a perspective view of two planet subgears with inserted spring bars.

The symmetry axis 14 can be seen best in FIG. 3.

Figure 2:
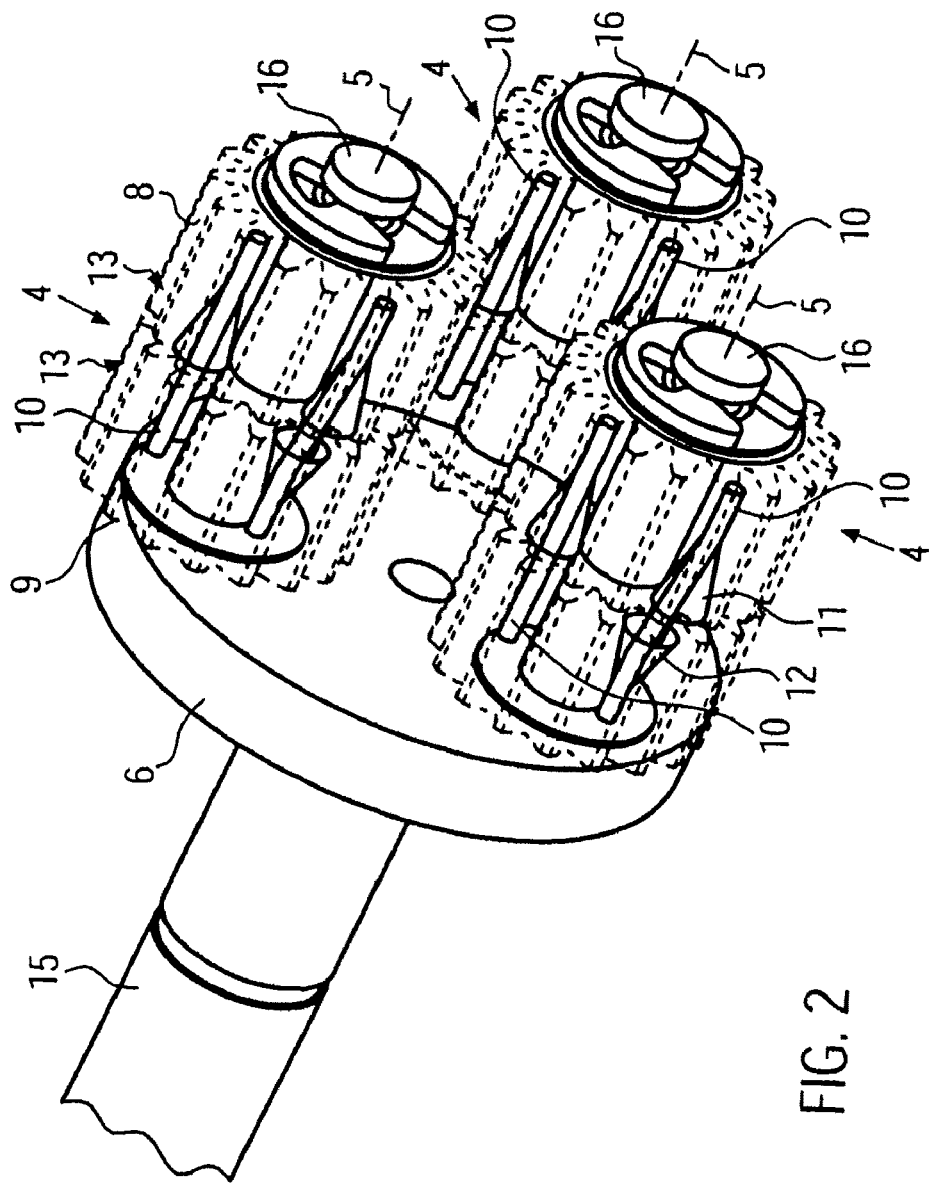
FIG. 2 shows a perspective detailed view of a planet carrier with three planet gears mounted on said planet carrier and comprising each two planet subgears, spring bars, which are subject to a bending load, being inserted in the planet subgears in trumpet-shaped holes.

FIG. 2 shows a perspective detailed view of the planet carrier 6 and of the three planet gears 4. The driven shaft, which can clearly be seen in FIG. 2, is designated by reference numeral 15. The shafts on which the planet gears 4 are rotatably supported are designated by reference numeral 16. In FIG. 2 it can clearly be seen that the teeth 13 of the two planet subgears 8 and 9 are in alignment with one another, when the spring bars 10 are bent.

The trumpet-shaped recesses 11 and 12, in which the spring bars 10 are provided, are arranged around the planetary axis of rotation 5, so are the spring bars 10. According to one variant it is possible to adjust the desired spring force by purposefully selecting the number of spring bars. This will be particularly expedient when the planetary gear unit is used in multistage gear boxes, and here especially in the last stage, i.e. the output stage.

The division of six recesses into two substantially opposed quadrants of a planet subgear 8 and 9 facilitates a precise adjustment of the gear unit.

FIG. 3 shows in a further detailed view the two planet subgears 8 and 9 together with the bent spring bars 10 in a condition in which they are inserted in the respective first and second recesses 11 and 12. The bending of the spring bars 10 takes place when the teeth 13 of the first planet subgear 8 are in alignment with the respective teeth of the second planet subgear 9.

Figure 4:
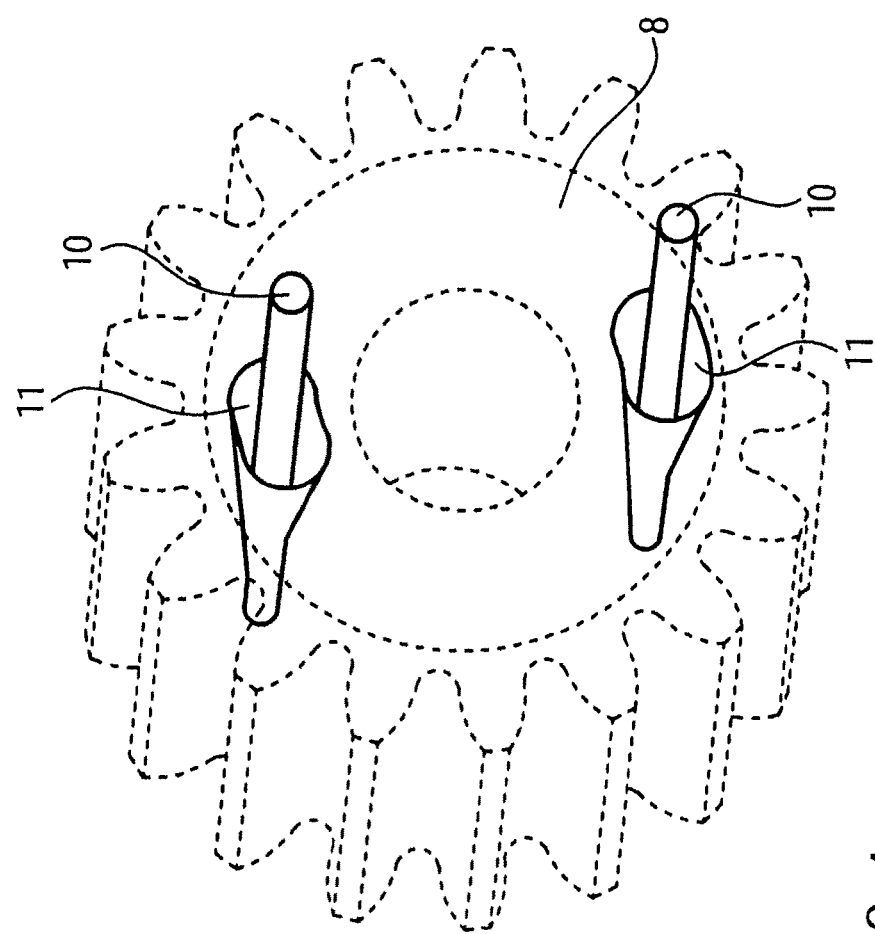
FIG. 4 shows a perspective view of recesses widening in a fan-shaped manner in the direction of rotation.

In FIG. 4 the first planet subgear 8 is shown. The recesses 11 are, however, no longer trumpet-shaped, but fan-shaped, said recesses being configured such that they become narrower in a direction away from the plane of division. In addition, they are configured such that they are curved in the direction of rotation. The two recesses 11 have a circular or oval end portion in the area remote from the plane of division, said end portion defining a tight sliding seat with respect to the respective spring bar inserted, which is circular in cross-section.

The invention claimed is:

1. A backlash-free planetary gear unit comprising:
a sun gear, an internal gear and at least one planet gear which is in mesh with said sun gear and said internal gear and which is arranged on a planet carrier such that it is rotatable about a planetary axis of rotation,
wherein the planet gear has a plane of division which is oriented perpendicular to the planetary axis of rotation and by which the planet gear is divided into a first planet subgear and a second planet subgear,
wherein the first planet subgear is preloaded relative to the second planet subgear by a spring bar arranged in these two planet subgears substantially parallel to the planetary axis of rotation,
at least one spring bar, which is subject to a bending load and which is supported in the two planet subgears, is arranged around the planetary axis of rotation, wherein the at least one spring bar is arranged in a first recess of the first planet subgear and in a second recess of the second planet subgear, wherein said first and second recesses extend up to and into the area of the plane of division, and wherein the first recess and the second recess are implemented as holes widening towards the plane of division, and wherein, in the direction in which the planet subgears are rotatably displaced relative to one another, the hole widens in a kidney-shaped or fan-shaped manner in the area of the plane of division.

2. A planetary gear unit according to claim 1, wherein the at least one spring bar is made of metallic material.

3. A planetary gear unit according to claim 1, wherein at least one of the first or second recesses is implemented as a through hole and has, on the side remote from the plane of division, a diameter which is smaller than the diameter of the spring bar(s).

4. A planetary gear unit according to claim 1, wherein the hole is implemented as a blind hole.

5. A planetary gear unit according to claim 4, wherein the blind holes are conical in shape.

6. A planetary gear unit according to claim 1, wherein the first planet subgear is preloaded relative to the second planet subgear by means of three spring bars which are arranged such that they are equidistant to one another.

7. A planetary gear unit according to claim 1, wherein the spring bars extend through ¾ to ⅞ of the thickness of the first and/or second planet subgear(s), said thickness measured in the direction of the planetary axis of rotation.

8. A planetary gear unit according to claim 1, wherein the first recesses are displaced relative to the second recesses, when teeth of the first planet subgear are in alignment with teeth of the second planet subgear.

9. A planetary gear unit according to claim 8, wherein a first recess is tangentially displaced relative to a second recess, mirror-symmetrically with respect to a symmetry axis through the respective tooth and the planetary axis of rotation.

10. A planetary gear unit according to claim 1, wherein the spring bars are held in a tight sliding seat in a section of the first and/or second recess(es) which is remote from the plane of division.

11. A planetary gear unit according to claim 1, wherein the spring bars, which are straight when no load is applied to them, have a non-varying round cross-section.

\* \* \* \* \*